United States Patent
Wu et al.

(10) Patent No.: US 9,182,471 B2
(45) Date of Patent: Nov. 10, 2015

(54) SUN TRACKING METHOD AND SUN TRACKING SYSTEM

(75) Inventors: Jiunn-Chi Wu, Taoyuan County (TW); Chih-Kuang Lin, Taoyuan County (TW); Pi-Cheng Tung, Taoyuan County (TW); Wei-Hann Yao, Taoyuan County (TW)

(73) Assignee: National Central University, Taoyuan (TW)

(*) Notice: Subject to any disclaimer, the term of this patent is extended or adjusted under 35 U.S.C. 154(b) by 968 days.

(21) Appl. No.: 13/353,311

(22) Filed: Jan. 18, 2012

(65) Prior Publication Data

US 2012/0193512 A1    Aug. 2, 2012

(30) Foreign Application Priority Data

Jan. 27, 2011 (TW) .............................. 100103086 A
Oct. 18, 2011 (TW) .............................. 100137750 A

(51) Int. Cl.
*G01J 1/20* (2006.01)
*G01S 3/786* (2006.01)
*F24J 2/38* (2014.01)
*G05D 3/10* (2006.01)
*F24J 2/54* (2006.01)
*H01L 31/042* (2014.01)

(52) U.S. Cl.
CPC ............... *G01S 3/7861* (2013.01); *F24J 2/38* (2013.01); *F24J 2/542* (2013.01); *G05D 3/105* (2013.01); *H02S 20/00* (2013.01); *Y02E 10/47* (2013.01); *Y02E 10/50* (2013.01)

(58) Field of Classification Search
CPC ............ F24J 2/38; F24J 2/542; G01S 3/7861; G05D 3/105; H02S 20/00; Y02E 10/47; Y02E 10/50

USPC ................ 250/203.4, 203.3, 214.1, 214 R; 356/141.5, 139.01–139.03

See application file for complete search history.

(56) References Cited

U.S. PATENT DOCUMENTS

| | | | | |
|---|---|---|---|---|
| 7,507,941 B2 * | 3/2009 | Yeh | ...... | G01S 3/7861 250/203.4 |
| 8,314,512 B2 * | 11/2012 | Ou | ...... | H02J 7/35 307/43 |
| 2008/0066735 A1 * | 3/2008 | Yeh | ...... | G01S 3/7861 126/578 |

(Continued)

FOREIGN PATENT DOCUMENTS

| | | |
|---|---|---|
| CN | 101459391 A | 6/2009 |
| JP | 62-013807 | 7/1988 |

(Continued)

*Primary Examiner* — Seung C Sohn
(74) *Attorney, Agent, or Firm* — CKC & Partners Co., Ltd.

(57) ABSTRACT

A sun tracking method is disclosed. The method can track the position of sun continuously, without the need to install an optical sensor, to calculate a sun-tracking solar orbit function, and to calibrate the mechanical structure periodically. The method comprises the steps outlined below. (A) A motor of an attitude control device is driven for changing attitude of a photovoltaic cell device to sense and record a short-circuit current by a short-circuit current measuring device directly or in cooperation with the switching behavior of a switch power unit of a maximum power tracking control device, or to sense and to record an output power by a power measuring device. (B) A maximum value of the short-circuit current or the output power is calculated. (C) The motor-driving device is driven for modulating the photovoltaic cell device to an attitude corresponding to the maximum value of the short-circuit current or the output power.

37 Claims, 10 Drawing Sheets

(56) References Cited

U.S. PATENT DOCUMENTS

| | | |
|---|---|---|
| 2008/0258051 A1 | 10/2008 | Heredia et al. |
| 2010/0018518 A1 | 1/2010 | McDonald |
| 2010/0171482 A1 | 7/2010 | Ye et al. |
| 2011/0067744 A1* | 3/2011 | Ou .................. H02J 7/35 136/244 |

FOREIGN PATENT DOCUMENTS

| | | |
|---|---|---|
| JP | 63-181015 | 7/1988 |
| JP | 2003-076425 | 3/2003 |
| JP | 2006310400 A | 11/2006 |
| JP | 2007231613 A | 9/2007 |
| JP | 2008091670 | 4/2008 |
| JP | 2012516059 A | 7/2012 |
| TW | 200723665 A | 6/2007 |
| TW | 200901491 A | 1/2009 |
| TW | M354725 U | 4/2009 |
| TW | I315777 | 10/2009 |
| TW | 201014146 A | 4/2010 |
| TW | 201042220 A | 12/2010 |
| WO | 2008109264 A1 | 9/2008 |
| WO | 2010085592 A2 | 7/2010 |

* cited by examiner

SUN TRACKING METHOD AND SUN TRACKING SYSTEM

RELATED APPLICATIONS

This application claims priority to Taiwan Application Serial Numbers 100103086, filed Jan. 27, 2011 and 100137750, filed Oct. 18, 2011, which are herein incorporated by reference.

BACKGROUND

1. Technical Field

The present disclosure relates to a sun tracking method and a sun tracking system. More particularly, the present disclosure relates to a sun tracking method and a sun tracking system that is able to continuously track the position of the sun without additional light sensors, calculation of the solar orbit function, regular calibration of the mechanical structure of the sun tracking system regularly or precise initial installation of the sun tracking system.

2. Description of Related Art

Concentrated photovoltaic (CPV) system is a conventional photovoltaic device that uses optical devices to concentrate a large area of sunlight onto the photovoltaic cells. The method of concentrating the sunlight reduces the area of the photovoltaic cells and makes the CPV system cost-effective. However, it makes the CPV system become sensitive to the incident angle of the sunlight as well. The further reduction of the area of the photovoltaic cells adapted in the highly concentrated photovoltaic system (with a concentration ratio higher than 500) makes the offset of the tracking angle that is tolerable by the light-concentrating module reduced at the same time. Accordingly, the precision of the tracking system becomes more and more important. In order to concentrate the sunlight precisely on the photovoltaic cells, a tracking device is necessary to be adapted to the light-concentrating module to modulate the axis of the light-concentrating module toward the sun.

In the CPV system, the tracking device performs the tracking mechanism in cooperation with the sensing device. The sensing device makes use of a plurality of light sensors disposed in different places and the pillars that o generate shadows to make the light incident to the light sensors uneven. The uneven incident light results in different voltage outputs generated by the light sensors. The direction of the incident light that has the highest intensity can hence be determined by the voltage values of the voltage outputs. There are various kinds of sensors such as optical conductors, photodiodes, phototransistors and photovoltaic cells. Each of the light sensors generates a corresponding short-circuit current according to the intensity of the incident sunlight, where the short-circuit current becomes larger when the intensity of the sunlight becomes higher. The amount of the short-circuit current is then outputted in a voltage form.

Please refer to FIG. 1. FIG. 1 is a 3-D view of a conventional sun tracking system. The conventional sun tracking system is a CPV system having a photovoltaic cell device 11, an attitude control device 12, a light-sensing device 13 and a micro-control device 14. The micro-control device 14 is coupled to the attitude control device 12 and the light-sensing device 13. The attitude control device 12 has an azimuth angle control unit 121 and an elevation angle control unit 122 to adjust the attitude (including an azimuth angle and an elevation angle) of the photovoltaic cell device 11.

When the photovoltaic cell device 11 is in operation, the light-sensing device 13 keeps sensing the intensity of the light incident thereon. The micro-control device 14 drives a motor driving device to drive a motor in the attitude control device 12 according to the light-sensing result to adjust the attitude of the photovoltaic cell device 11 and the light-sensing device 13. However, a time-consuming initial calibration is needed when the light-sensing device is adapted to make the four (or a plurality of) light sensors of the light-sensing device generate the same amount of output voltage/current when the photovoltaic cell device 11 faces directly to the sun.

Moreover, after the conventional sun tracking system operations for a certain time period, the mechanical structure of the system may be damaged, deformed or loosened due to the environmental effect to change the relative position of the photovoltaic cell device 11 and the light-sensing device 13. On the other hand, the light sensors of the light-sensing device 13 deteriorate over time since they are under the sun for a long time. Accordingly, the direction of the incident light having the highest intensity detected by the light-sensing device 13 may not correspond to the attitude of the photovoltaic cell device 11 that can receive the largest amount of sunlight. Comparing to the initial state of the sun tracking system, the efficiency of the conventional sun tracking system degrades more when the operation time is longer.

In order to avoid the above defects, regular calibrations of the mechanical structure are need to make the relative position of photovoltaic cell device 11 and the light-sensing device 13 back to the initial state. However, the regular calibrations make the maintenance cost increase and persecute the maintainer as well.

On the other hand, some conventional sun tracking systems use complex solar orbit function to calculate the position of the sun to adjust the attitude of the photovoltaic cell device. The result of the calculation of the complex solar orbit function is reliable only when the initial position of the sun is extremely precise. If an offset of the initial position is present, the error is generated in the calculation result. Therefore, a precise initial setting of the architecture and the position of the system is unavoidable in such a kind of to conventional sun tracking systems. The installation cost of the conventional sun tracking systems thus increases.

Accordingly, what is needed is a sun tracking method and a sun tracking system that is able to continuously track the position of the sun without additional light sensors, calculation of the solar orbit function, regular calibration of the mechanical structure of the sun tracking system regularly or precise initial installation of the sun tracking system.

Moreover, in order to make the photovoltaic cell device generates the maximum output power, a maximum power point tracking (MPPT) device is installed. The maximum power point tracking (MPPT) device has a voltage-increasing circuit or a voltage-increasing/decreasing circuit. A measurement of the voltage, current or power is performed to generate a feedback signal to control the power transistors of the voltage-increasing circuit or the voltage-increasing/decreasing circuit such that the photovoltaic cell device can always generate the maximum output power after the photovoltaic conversion no matter what the condition of the illumination of the sunlight and the load is. The short-circuit current of the photovoltaic cell or the output power of the photovoltaic cell is also at the maximum value when the photovoltaic cell device faces directly to the sun.

SUMMARY

An aspect of the present disclosure is to provide a sun tracking method adapted in a sun tracking system. The sun tracking system comprises a photovoltaic cell device, an attitude control device, a short-circuit current sensing device, a maximum power tracking control device, a motor-driving to device and a control unit such as a micro-controller, a computer or a Programmable Logic Controller (PLC), wherein the maximum power tracking control device at least comprises a switch power unit such as MOSFET or IGBT. The sun tracking method comprises the steps as follows. (A) The motor-driving device is droved to further drive a motor of the attitude control device to change the attitude of the photovoltaic cell device and a short-circuit current of the photovoltaic cell device is sensed and recorded by a short-circuit current sensing device continuously, in cooperation with the switching behavior of the switch power unit of the maximum power tracking control device. (B) A maximum value of the recorded short-circuit current is calculated with the control unit. (C) The motor-driving device is droved to modulate the attitude of the photovoltaic cell device such that the attitude of the photovoltaic cell device corresponds to the maximum value of the short-circuit current.

Another aspect of the present disclosure is to provide a sun tracking system. The sun tracking system comprises a photovoltaic cell device, an attitude control device, a short-circuit current sensing device, a maximum power tracking control device, a motor-driving device and a control unit such as a micro-controller, a computer or a Programmable Logic Controller (PLC). The photovoltaic cell device comprises a plurality of photovoltaic cells. The attitude control device is adapted to the photovoltaic cell device to control the attitude of the photovoltaic cell device. The short-circuit current sensing device is coupled to the photovoltaic cell device to sense a short-circuit current of the photovoltaic cell device. The maximum power tracking control device is coupled to the photovoltaic cell device to track a maximum power of the photovoltaic cell device. The motor-driving device is adapted to the attitude control device to drive a motor of the attitude control device to change the attitude of the photovoltaic cell device. The control unit is coupled to the short-circuit current sensing device, the maximum power tracking control device and the motor-driving device. When the photovoltaic cell device is in operation, the control unit drives the motor-driving device to further drive the motor of the attitude control device to change the attitude of the photovoltaic cell device and the short-circuit current sensing device senses and records a short-circuit current of the photovoltaic cell device continuously in cooperation with the switching behavior of the power unit of the maximum power tracking control device, the control unit further calculates a maximum value of the recorded short-circuit current to drive the motor-driving device to modulate the attitude of the photovoltaic cell device such that the attitude of the photovoltaic cell device corresponds to the maximum value of the short-circuit current.

Yet another aspect of the present disclosure is to provide a sun tracking method adapted in a sun tracking system. The sun tracking system comprises a photovoltaic cell device, an attitude control device, a short-circuit current sensing device, a motor-driving device and a control unit such as a micro-controller, a computer or a Programmable Logic Controller (PLC), wherein the short-circuit current sensing device at least comprises a switch power unit such as MOSFET or IGBT and a current-sensing circuit unit. The sun tracking method comprises the steps as follows. (A) The motor-driving device is droved to further drive a motor of the attitude control device to change the attitude of the photovoltaic cell device and a short-circuit current of the photovoltaic cell device is sensed directly without in cooperation with the switching behavior of the power unit of the maximum power tracking control device and recorded by using the short-circuit current sensing device at a moment when the switch power unit forms a closed circuit. (B) A maximum value of the recorded short-circuit current is calculated with the control unit. (C) The motor-driving device is droved to modulate the attitude of the photovoltaic cell device such that the attitude of the photovoltaic cell device corresponds to the maximum value of the short-circuit current.

Another aspect of the present disclosure is to provide sun tracking method adapted in a sun tracking system. The sun tracking system comprises a photovoltaic cell device, an attitude control device, a maximum power tracking control device, a motor-driving device and a control unit, wherein the maximum power tracking control device at least comprises a switch power unit such as MOSFET or IGBT and a current, voltage or power sensing device. The sun tracking method comprises the steps as follows. (A) The motor-driving device is droved to further drive a motor of the attitude control device to change the attitude of the photovoltaic cell device and the current, voltage or power of the maximum power tracking control device is sensed and recorded by the current, voltage or power sensing device installed in the maximum power tracking control device. It is noted that in order to calculate or measure the power, the current and voltage need be sensed first. It is noted that the current, voltage or power of the maximum power tracking control device is corresponding to the output current, voltage or power of the photovoltaic cell device. (B) A maximum value of the recorded output power is calculated with the control unit such as a micro-controller, a computer or a Programmable Logic Controller (PLC). (C) The motor-driving device is droved to modulate the attitude of the photovoltaic cell device such that the attitude of the photovoltaic cell device corresponds to the maximum value of the output power.

Another aspect of the present disclosure is to provide a sun tracking system. The sun tracking system comprises a photovoltaic cell device, an attitude control device, a short-circuit current sensing device, a motor-driving device and a control unit such as a micro-controller, a computer or a Programmable Logic Controller (PLC). The photovoltaic cell device comprises a plurality of photovoltaic cells. The attitude control device is adapted to the photovoltaic cell device to control the attitude of the photovoltaic cell device. The short-circuit current sensing device is coupled to the photovoltaic cell device to sense a short-circuit current of the photovoltaic cell device, wherein the short-circuit current sensing device at least comprises a switch power unit such as MOSFET or IGBT and a current-sensing circuit unit. The motor-driving device is adapted to the attitude control device to drive a motor of the attitude control device to change the attitude of the photovoltaic cell device. The control unit is coupled to the short-circuit current sensing device and the motor-driving device. When the photovoltaic cell device is in operation, the control unit drives the motor-driving device to further drive the motor of the attitude control device to change the attitude of the photovoltaic cell device and the short-circuit current sensing device senses and records a short-circuit current of the photovoltaic cell device at a moment when the switch power unit forms a closed circuit, the control unit further calculates a maximum value of the recorded short-circuit current to drive the motor-driving device to modulate the attitude of the photovoltaic cell device such that the attitude of the photovoltaic cell device corresponds to the maximum value of the short-circuit current.

Another aspect of the present disclosure is to provide a sun tracking system. The sun tracking system comprises a photovoltaic cell device, an attitude control device, a maximum power tracking control device, a motor-driving device and a control unit such as a micro-controller, a computer or a Programmable Logic Controller (PLC). The photovoltaic cell device comprises a plurality of photovoltaic cells. The attitude control device is adapted to the photovoltaic cell device to control the attitude of the photovoltaic cell device. The maximum power tracking control device is coupled to the photovoltaic cell device to track a maximum power of the photovoltaic cell device, wherein the maximum power tracking control device at least comprises a switch power unit such as MOSFET or IGBT and a current, voltage or power sensing device. The motor-driving device is adapted to the attitude control device to drive a motor of the attitude control device to change the attitude of the photovoltaic cell device. The control unit is coupled to the maximum power tracking control device and the motor-driving device. When the photovoltaic cell device is in operation, the control unit drives the motor-driving device to further drive the motor of the attitude control device to change the attitude of the photovoltaic cell device and the current, voltage or power of the maximum power tracking control device is sensed and recorded by the current, voltage or power sensing device installed in the maximum power tracking control device, the control unit further calculates a maximum value of the recorded output power to drive the motor-driving device to modulate the attitude of the photovoltaic cell device such that the attitude of the photovoltaic cell device corresponds to the maximum value of the output power. It is noted that in order to calculate or measure the power, the current and voltage need be sensed first.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
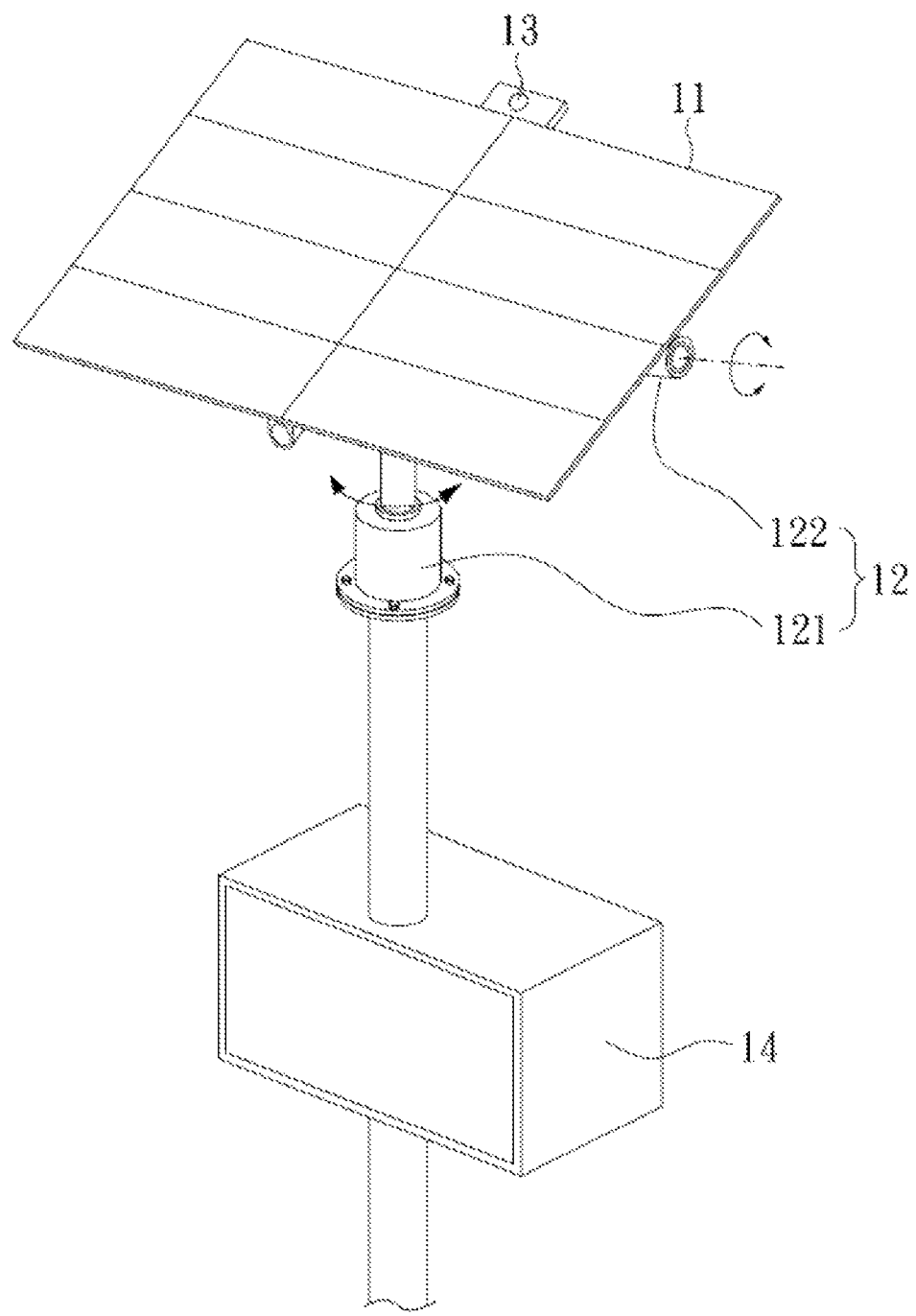
FIG. 1 is a 3-D view of a conventional sun tracking system.

Reference will now be made in detail to the present embodiments of the disclosure, examples of which are illustrated in the accompanying drawings. Wherever possible, the same reference numbers are used in the drawings and the description to refer to the same or like parts.

In the maximum power point tracking (MPPT) technology adapted in the conventional photovoltaic cell system, the measured short-circuit current is a current that passes through an inductor. Though the short-circuit current mentioned above is relative to the illumination of the sunlight and the offset-angle of the sun-tracking, it is affected by the loading and the duty cycle of the PWM controlled by the transistor in the DC-DC converter. Consequently, the measured short-circuit current that passes through the inductor cannot be used to track the angle of the sun (i.e. the position of the sun).

However, the short-circuit current is sensed (through a short-circuit current sensing device) when the two ends of the photovoltaic cell device is short-circuited in the sun tracking method and the sun tracking system of the present disclosure. The short-circuit current does not pass through any inductor. Consequently, the short-circuit current in the sun tracking method and the sun tracking system is only relative to the illumination of the sunlight and the offset-angle of the sun-tracking and can be used to track the angle of the sun (i.e. the position of the sun).

Figure 2:
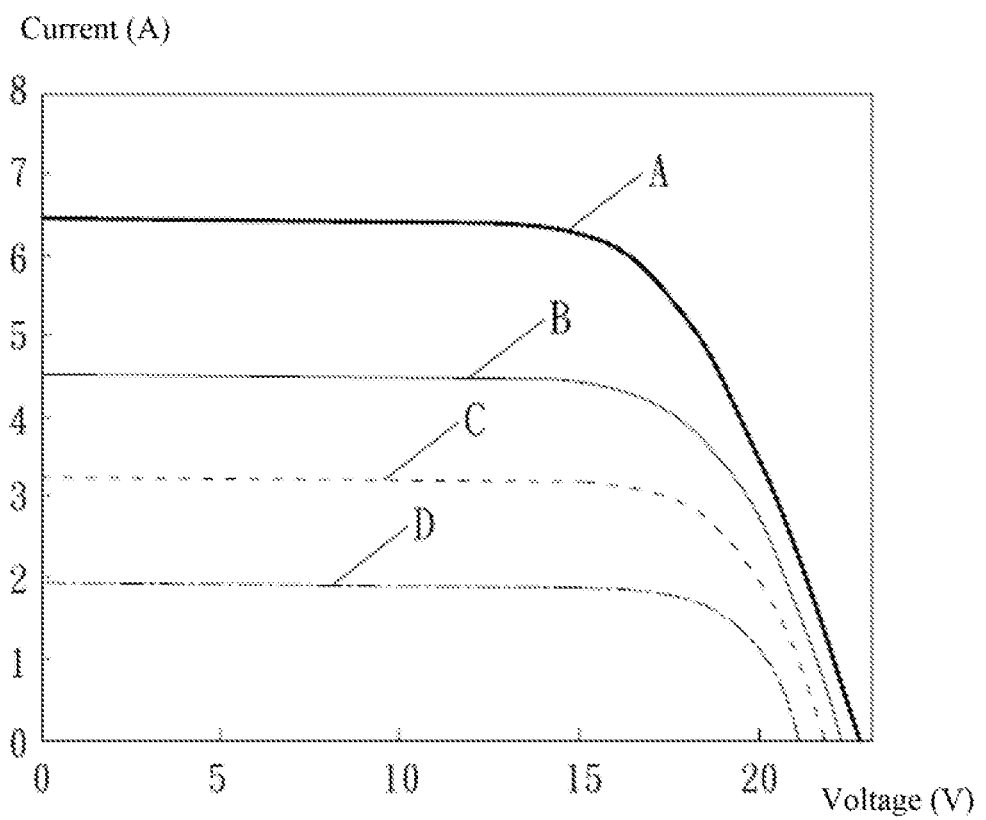
FIG. 2 is a diagram of the relation of the output current and the voltage of a photovoltaic cell device under an environment with a fixed temperature.

Please refer to FIG. 2. FIG. 2 is a diagram of the relation of the output current and the voltage of a photovoltaic cell device under an environment with a fixed temperature. The different curves depicted in FIG. 2 stand for the relation of the output current and the voltage of the photovoltaic cell device under different intensity of the sunlight, wherein the order of the intensity corresponding to the curves A, B, C and D is A>B>C>D. Besides, the value of the current at the point of each of the curve (corresponding to different intensities of the sunlight) where the voltage is zero is the value of the short-circuit current of each of the curve.

In the light of FIG. 2, it is obvious that the short-circuit current changes in accordance to the variation (such as decrease) of the illumination of the sunlight. For example, the value of the short-circuit current may change from the point of zero voltage on curve A to the point of zero voltage on curve C. In other words, the value of the short-circuit current is in direct proportion to the illumination of the sunlight. When the measured short-circuit current reaches a maximum value, the attitude of the photovoltaic cell device corresponding to the maximum short-circuit current is the attitude that can receive the sunlight with the highest intensity. In general, such an attitude is the attitude that faces directly to the sun. Therefore, by recording the short-circuit currents of the photovoltaic cell device and retrieving the maximum value among them, the position of the sun can be tracked in the sun tracking method and the sun tracking system of the present disclosure.

Figures 3A, 3B, 3C:
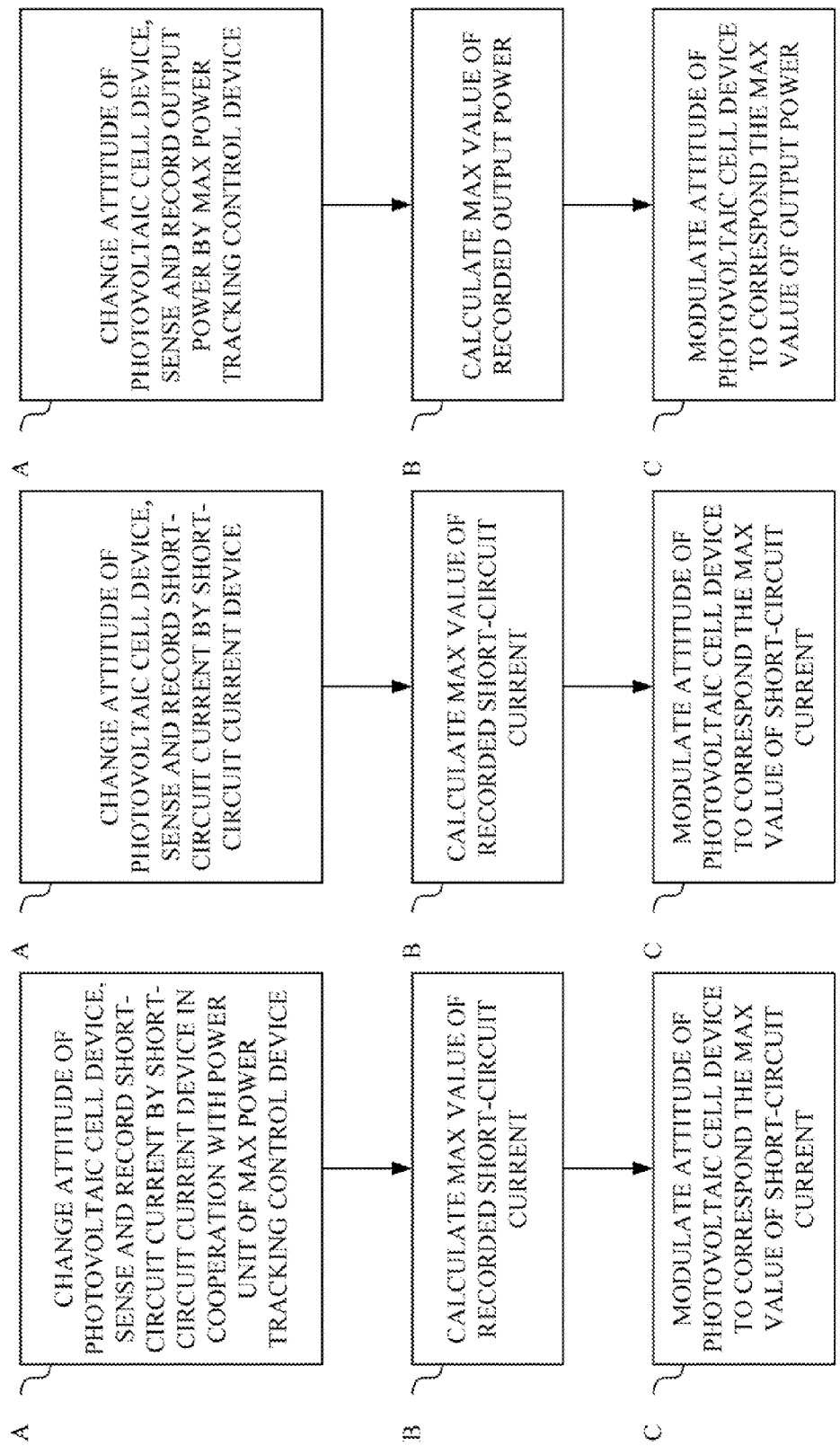
FIG. 3A-FIG. 3C are flow charts of the sun tracking method in different embodiments of the present disclosure.
Figure 4A:
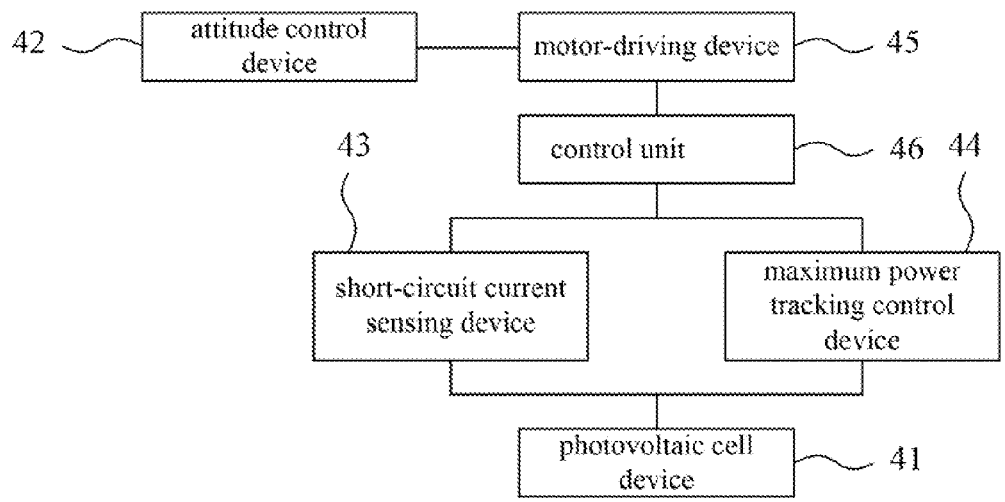
FIG. 4A-FIG. 4C are block diagrams of the sun tracking system corresponding to the process of the sun tracking method depicted in FIG. 3A-FIG. 3C respectively.
Figure 4B:
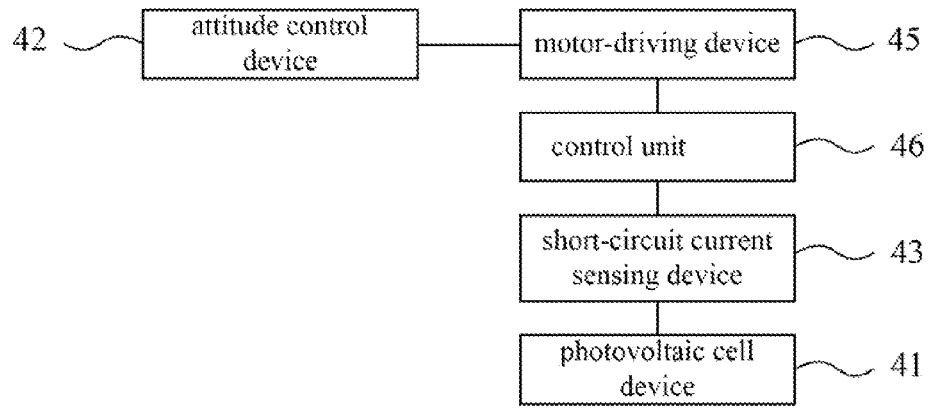
Figure 4C:
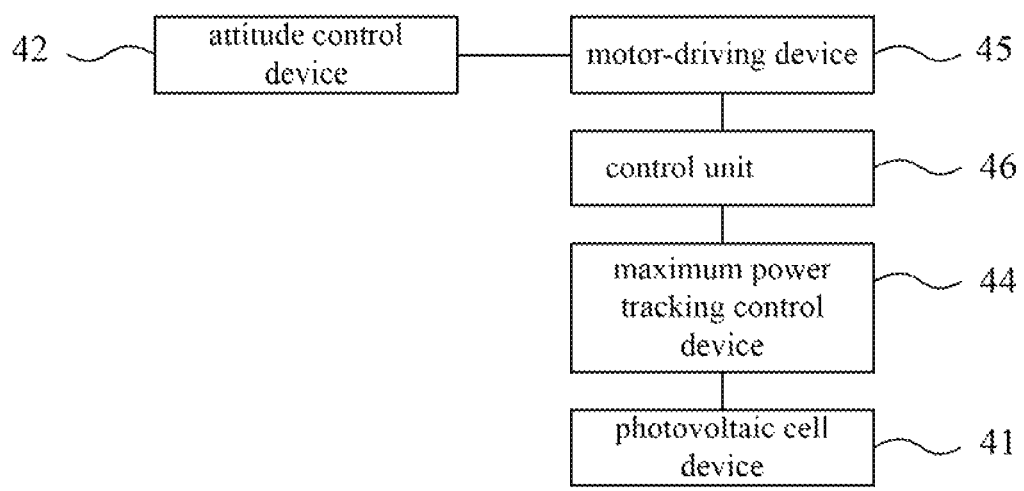

Please refer to FIG. 3A to FIG. 3C and FIG. 4A to FIG. 4C at the same time. FIG. 3A to FIG. 3C are flow charts of the sun tracking method in different embodiments of the present disclosure. FIG. 4A to FIG. 4C are block diagrams of the sun tracking system corresponding to the sun tracking method shown in FIG. 3A to FIG. 3C respectively. The process of the sun tracking method depicted in FIG. 3A comprises the steps as follow.

(A) The motor-driving device is droved to further drive a motor of the attitude control device to change the attitude of the photovoltaic cell device and a short-circuit current of the photovoltaic cell device is sensed and recorded by a short-circuit current sensing device continuously, in cooperation with the switching behavior of the power unit of the maximum power tracking control device. (B) A maximum value of the recorded short-circuit current is calculated with the control unit. (C) The motor-driving device is droved to modulate the attitude of the photovoltaic cell device such that the attitude of the photovoltaic cell device corresponds to the maximum value of the short-circuit current.

As shown in FIG. 4A, the sun tracking system that adapts the sun tracking method depicted in FIG. 3A comprises a photovoltaic cell device 41, an attitude control device 42, a short-circuit current sensing device 43, a maximum power tracking control device 44, a motor-driving device 45 and a control unit 46. The maximum power tracking control device 44 at least comprises a switch power unit 445.

Figure 5:
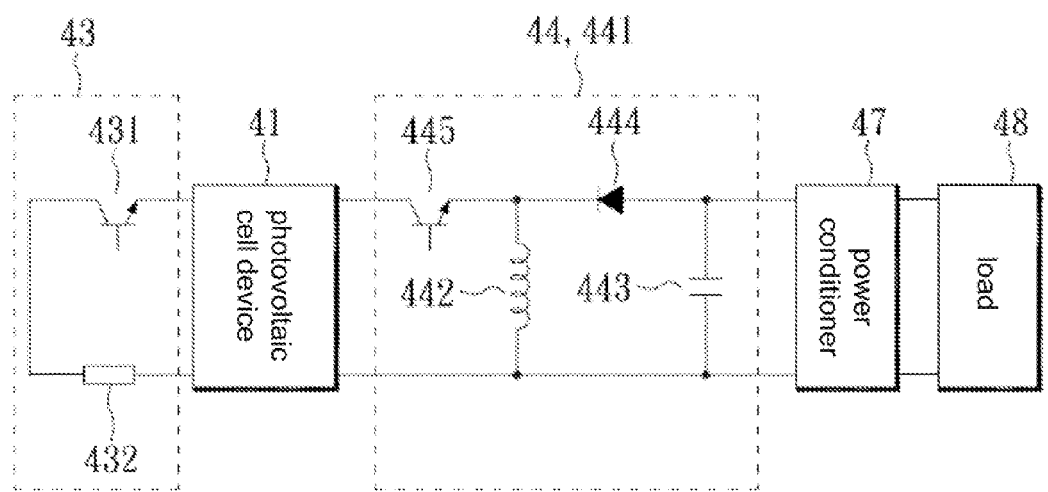
FIG. 5 is a diagram depicting the relation of the photovoltaic cell device, the short-circuit current sensing device and the maximum power tracking control device.

Please refer to FIG. 5. FIG. 5 is a diagram depicting the relation of the photovoltaic cell device 41, the short-circuit current sensing device 43 and the maximum power tracking control device 44. The short-circuit current sensing device 43 comprises at least comprises a first switch power unit 431 and a current-sensing circuit unit 432. The maximum power tracking control device 44 comprises a voltage up/down adjusting circuit unit 441 having at least an inductor 442, a capacitor 443, a diode 444 and a second switch power unit 445.

In the present embodiment, the short-circuit current sensing device 43 is coupled to the photovoltaic cell device 41. The maximum power tracking control device 44 is coupled to the photovoltaic cell device 41 at the other end. Besides, the maximum power tracking control device 44 is coupled to a power conditioner (e.g. inverter) 47 and a load 48 to generate an output current to the load 48. When the sun tracking method of the present disclosure is in operation, the first switch power unit 431 in the short-circuit current sensing device 43 and the second switch power unit 445 in the maximum power tracking control device 44 conduct alternatively to alternatively sense and record the short-circuit current of the photovoltaic cell device 41 and to track a maximum power of the photovoltaic cell device 41. In other words, the sun tracking method is operated in cooperation with the voltage up/down adjusting procedure for tracking the maximum power of the photovoltaic cell device 41 adapted in the maximum power tracking control device 44. The sensing of the short-circuit current of the photovoltaic cell device 41 (when the first switch power unit 431 is closed and conducting) is performed during the break of the of the voltage up/down adjusting procedure (when the second switch power unit 445 is open-circuited and non-conducting).

On the other hand, when the sun tracking method of the present disclosure is in operation, the current-sensing circuit unit 432 of the short-circuit current sensing device 43 sense the short-circuit current of the photovoltaic cell device 41 by a resistive measurement method, a Hall effect measurement method or a CT method. The resistive measurement method is a common way to measure the current. By connecting a resistor with small resistance to the under-measured current and measuring the potential difference between the two ends of the resistor, the function V=IR can be used to calculate the value of the current since the current is in direct proportion to the voltage when the resistive of the resistor is fixed. The advantage of the resistive measurement method is that it is simple and is suitable for both AC and DC. The disadvantage includes low output voltage, large insertion loss and difficulty of the insulation from the current.

The CT method is to make the under-test wire pass through a magnetic path. A magnetic filed B is generated due to the presence of the current $I_0$ in the magnetic path to further induce an induced current at the coil on the magnetic path. The resistive measurement method described above can further be used to measure the value of the induced current. The difference between the CT method and the resistive measurement method is that there is no resistor directly coupled to the current $I_0$ during the measurement of the induced current. The advantage of the CT method includes wider range of application, larger output voltage and the great quality of insulation from the current. The Hall effect measurement method is similar to the CT method that makes use of the magnetic field of the magnetic path generated by the presence of the under-measured current. The difference between the Hall effect measurement method and the CT method is that a space is presented in the magnetic path when the Hall effect measurement method is adapted to dispose a Hall element in said space. The generated magnetic field makes the Hall element generate a Hall voltage that can be measured to further derive the value of the under-measured current.

The process of the sun tracking method depicted in FIG. 3B comprises the steps as follow.

(A) The motor-driving device is droved to further drive a motor of the attitude control device to change the attitude of the photovoltaic cell device and a short-circuit current of the photovoltaic cell device is sensed directly without in cooperation with the switching behavior of the power unit of the maximum power tracking control device and recorded by using the short-circuit current sensing device at a moment when the switch power unit forms a closed circuit. (B) A maximum value of the recorded short-circuit current is calculated with the control unit. (C) The motor-driving device is droved to modulate the attitude of the photovoltaic cell device such that the attitude of the photovoltaic cell device corresponds to the maximum value of the short-circuit current.

As shown in FIG. 4B, the sun tracking system does not take the maximum power tracking control device 44 into consideration. The sun tracking system in the present embodiment comprises a photovoltaic cell device 41, an attitude control device 42, a short-circuit current sensing device 43, a motor-driving device 45 and a control unit 46. The short-circuit current sensing device 43 in the present embodiment needs not to be coupled with the maximum power tracking control device 44 as in the embodiments shown in FIG. 4A. The short-circuit current sensing device 43 at least comprises a switch power unit 431 and a current-sensing circuit unit 432 as shown in FIG. 5. In the present embodiment, the short-circuit current sensing device 43 is coupled to the photovoltaic cell device 41. In normal condition, the power unit 431 is disconnected to the photovoltaic cell device 41. When the sun-tracking method is used, the power unit 431 starts to switch to be connected and disconnected to the photovoltaic cell device 41 in turn. The frequency of the switch behavior is very high (e.g. over 1000 times per second). The short-circuit current sensing device 43 senses and records the short-circuit current of the photovoltaic cell device 41 at the moment when the switch power unit 431 forms the closed circuit.

The process of the sun tracking method depicted in FIG. 3C comprises the steps as follow.

(A) The motor-driving device is droved to further drive a motor of the attitude control device to change the attitude of the photovoltaic cell device and the current, voltage or power of the maximum power tracking control device is sensed and recorded by the current, voltage or power sensing device installed in the maximum power tracking control device. It is noted that in order to calculate or measure the power, the current and voltage need be sensed first. (B) A maximum value of the recorded output power is calculated with the control unit. (C) The motor-driving device is droved to modulate the attitude of the photovoltaic cell device such that the attitude of the photovoltaic cell device corresponds to the maximum value of the output power.

As shown in FIG. 4C, the sun tracking system does not take the short-circuit current sensing device 43 into consideration.

The sun tracking system in the present embodiment comprises a photovoltaic cell device 41, an attitude control device 42, a maximum power tracking control device 44, a motor-driving device 45 and a control unit 46. The maximum power tracking control device 44 is a voltage up adjusting circuit or a voltage up/down adjusting circuit. The maximum power tracking control device 44 comprises a sensing device that senses current, voltage or power in order to calculate or measure the power.

Figure 6:
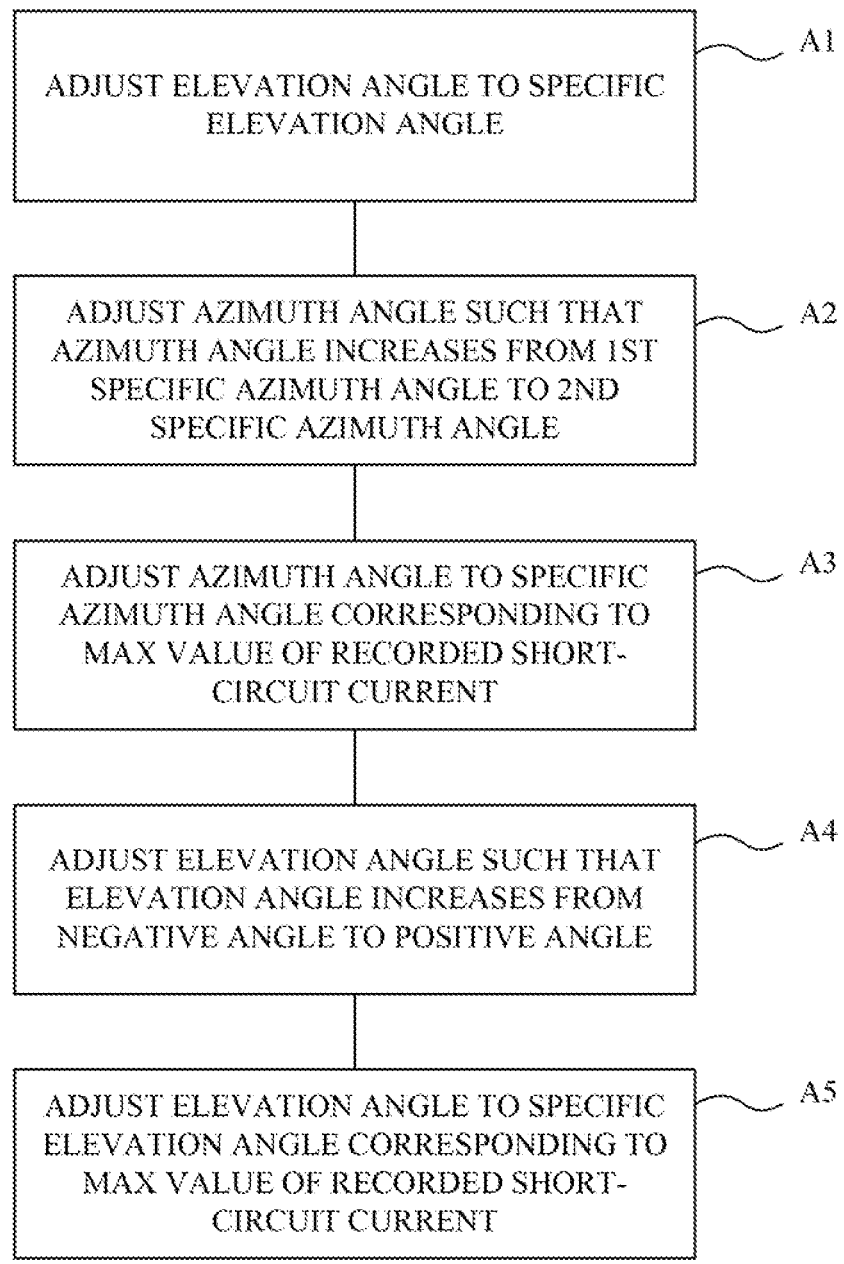
FIG. 6 is a flow chart of the search rule in step A of the sun tracking method depicted in FIG. 3 of an embodiment of the present disclosure.

In step (A) of the sun tracking method of the present disclosure, the attitude of the photovoltaic cell device 41, including an azimuth angle and an elevation angle, is changed according to a search rule. In an embodiment, the search rule is an AI-based algorithm. The AI-based algorithm can be a conventional algorithm such as, but not limited to, a fuzzy algorithm, an ant algorithm, a Taguchi algorithm or a genetic algorithm. Since these algorithms are conventional, no further detail is discussed here. Please refer to FIG. 6. FIG. 6 is a flow chart of the search rule of an embodiment of the present disclosure. In a common situation, the search rule adapted in step (A) of the sun tracking method of the present disclosure comprises the steps as follow.

(A1) The elevation angle of the photovoltaic cell device 41 is adjusted to a specific elevation angle.

(A2) The azimuth angle of the photovoltaic cell device 41 is adjusted such that the azimuth angle of the photovoltaic cell device increases from a first specific azimuth angle to a second specific azimuth angle.

(A3) The azimuth angle of the photovoltaic cell device 41 is adjusted to a specific azimuth angle corresponding to the maximum value of the recorded short-circuit current or the maximum value of the recorded power.

(A4) The elevation angle of the photovoltaic cell device 41 is adjusted such that the elevation angle of the photovoltaic cell device increases from a negative angle to a positive angle.

(A5) The elevation angle of the photovoltaic cell device 41 is adjusted to a specific elevation angle corresponding to the maximum value of the recorded short-circuit current or the maximum value of the recorded power.

The adjustable range of the elevation angle of the photovoltaic cell device 41 is determined by a location of at least one limit switch of the attitude control device 42. The adjustable range of the azimuth angle of the photovoltaic cell device 41 is determined by a location of at least one limit switch of the attitude control device 42.

For example, when a sun tracking system that adapts the sun tracking method of the present disclosure is activated in the morning, a larger area search is made until the sun tracking system of the present disclosure finds the current position of the sun (i.e. the photovoltaic cell device 41 of the sun tracking system faces directly to the sun) since the initial position of the sun is unknown.

According to step (A1) of the search rule, the elevation angle of the photovoltaic cell device 41 is adjusted to a specific elevation angle (e.g. 45 degrees) that is determined by a limit switch (such as an elevation angle limit switch). In step (A2), the azimuth angle of the photovoltaic. cell device 41 is adjusted by moving the photovoltaic cell device 41 in a clockwise direction from a first specific azimuth angle (e.g. 0 degree) to a second specific azimuth angle (e.g. 360 degrees) that are both determined by another limit switch (such as an azimuth angle limit switch). It's noticed that in other embodiments, the photovoltaic cell device 41 can also move in a counterclockwise direction such that the azimuth angle of the photovoltaic cell device 41 gradually decreases.

In step (A3), the azimuth angle of the photovoltaic cell device 41 is adjusted to a specific azimuth angle corresponding to a maximum value of the short-circuit current or the maximum value of the recorded power that is recorded during the change of the azimuth angle of the photovoltaic cell device 41. Afterwards, the azimuth angle of the photovoltaic cell device 41 is temporarily fixed.

In step (A4), the elevation angle of the photovoltaic cell device 41 is adjusted such that the elevation angle of the photovoltaic cell device increases from a negative angle (e.g. −80 degrees) to a positive angle (e.g. 80 degrees) that are both determined by yet another limit switch (such as an elevation angle limit switch). It's noticed that in other embodiments, the photovoltaic cell device 41 can also move from a positive angle (e.g. 80 degrees) to a negative angle (e.g. −80 degrees). Besides, the positive and the negative angles can be any angles other than 80 and −80 degrees. For example, the positive angle can be 85 degrees, and the negative angle can be −20 degrees.

In step (A5), the elevation angle of the photovoltaic cell device 41 is adjusted to a specific elevation angle corresponding to the maximum value of the recorded short-circuit current or the maximum value of the recorded power. Afterwards, the elevation angle of the photovoltaic cell device 41 is temporarily fixed.

After the search flow is finished, the attitude (the azimuth angle and the elevation angle) of the photovoltaic cell device 41 is decided. In other words, the photovoltaic cell device 41 faces about directly to the sun.

It's noticed that in the present embodiment, the azimuth angle (such as 0 degree and 360 degrees) and the elevation angle (such as 45 degrees, 80 degrees and −80 degrees) described above is relative to a specific reference attitude. The azimuth angle and the elevation angle at the reference attitude is considered to be 0 degree. In other embodiments, the reference attitude can be determined by the user in cooperation with the available hardware such as the number and position of the limit switch.

Figure 7:
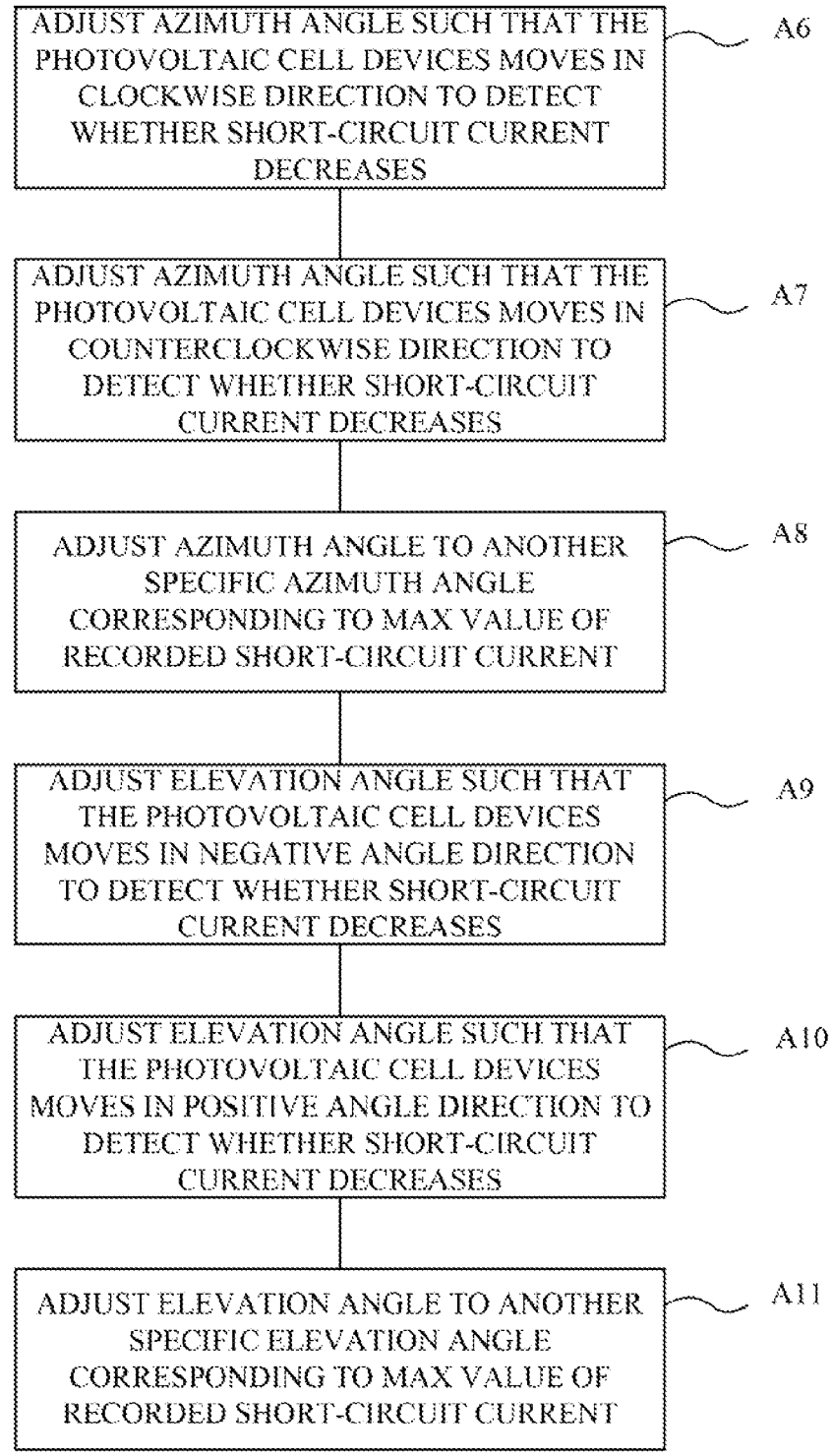
FIG. 7 is a flow of a search rule to perform a smaller area search after the search rule in FIG. 6 is finished.

Please refer to FIG. 7. FIG. 7 is a flow of a search rule to perform a smaller area search. In order to track the position of the sun more precisely (so that the photovoltaic cell device 41 can face the sun more precisely), a smaller area search can be performed in the sun tracking method of the present disclosure. The flow comprises the steps as follows.

(A6) The azimuth angle of the photovoltaic cell device 41 is adjusted such that the photovoltaic cell device 41 moves in a clockwise direction to detect whether the short-circuit current of the photovoltaic cell device 41 or the recorded power decreases.

(A7) The azimuth angle of the photovoltaic cell device 41 is adjusted such that the photovoltaic cell device 41 moves in a counterclockwise direction to detect whether the short-circuit current of the photovoltaic cell device 41 or the recorded power decreases.

(A8) The azimuth angle of the photovoltaic cell device 41 is adjusted to another specific azimuth angle corresponding to the maximum value of the recorded short-circuit current or the maximum value of the recorded power.

(A9) The elevation angle of the photovoltaic cell device 41 is adjusted such that the photovoltaic cell device 41 moves in a negative angle direction to detect whether the short-circuit current of the photovoltaic cell device 41 or the recorded power decreases.

(A10) The elevation angle of the photovoltaic cell device 41 is adjusted such that the photovoltaic cell device 41 moves in a positive angle direction to detect whether the short-circuit current of the photovoltaic cell device 41 or the recorded power decreases.

(A11) The elevation angle of the photovoltaic cell device 41 is adjusted to another specific elevation angle corresponding to the maximum value of the recorded short-circuit current or the maximum value of the recorded power.

As described above, after the large area search, the photovoltaic cell device 41 faces about directly to the sun. Hence, no matter how the azimuth angle (elevation angle) of the photovoltaic cell device 41 is adjusted after the large area search, the short-circuit current of the photovoltaic cell device 41 or the recorded power should decrease because photovoltaic cell device 41 leaves the position that receive the sunlight having the highest intensity. However, a large area search has to search for every possible direction (ranging 360 degrees of azimuth angle and 160 degrees of elevation angle). Therefore, the precision is often set to be low when the large area search is performed on the short-circuit current sensing device 43 such that the large area search is not time-consuming.

Because the low precision of the short-circuit current sensing device 43 used in the large area search, the attitude determined by the sun tracking method using the large area search with low precision may not be the correct attitude that can receive the sunlight having the highest intensity. Consequently, step (A6) to step (A11) depicted in FIG. 7 provide a small area search to balance the tradeoff between the precision and the consumed-time. Even the precision of the short-circuit current sensing device 43 or the recorded power is adjusted to the highest level, the time consumed by the small area search can be within an acceptable range due to the small area ranging at most from 5 degrees to −5 degrees. After the small area search, the photovoltaic cell device 41 can face to the sun in a direct way with higher precision. Hence, the position of the sun can be tracked with higher precision in the sun tracking method of the present disclosure.

The position of the sun changes (by moving in the sky) gradually over time. Hence, after a predetermined time interval (e.g. 1 minutes to 10 minutes) passes and/or after the maximum value of the recorded short-circuit current decreases to a certain level (such as 95% of the original maximum value), the position of the sun needs to be tracked again. The sun tracking method of the present disclosure further comprises a step (D) to change the attitude of the photovoltaic cell device 41 according to a search rule after a predetermined time interval to sense and record the short-circuit current of the photovoltaic cell device 41 by the short-circuit current sensing device 43 continuously to modulate the attitude of the photovoltaic cell device 41 such that attitude of the photovoltaic cell device 41 corresponds to the newly-calculated maximum value of the short-circuit current. In another embodiment, the sun tracking method of the present disclosure may further comprises a step (D) to change the attitude of the photovoltaic cell device 41 according to a search rule after a predetermined time interval to sense and record the power of the maximum power tracking control device by the sensing device continuously to modulate the attitude of the photovoltaic cell device 41 such that attitude of the photovoltaic cell device 41 corresponds to the newly-calculated maximum value of the power.

In the present embodiment, the predetermined time interval described above can be 3 to 10 minutes. Nevertheless, if an instant tracking is needed, the predetermined time interval can be shorten to 1 minute or within 1 minute. Besides, the search rule adapted to the sun tracking method of the present disclosure can be a perturbation and observation method (i.e., perturb the attitude of the photovoltaic cell device and observe the short-circuit current of the photovoltaic cell or the output power of the photovoltaic cell to find the attitude corresponding to the maximum short-circuit current or the maximum output power) or an AI (artificial intelligent)-based algorithm (depending on different applications) to find the attitude corresponding to the maximum short-circuit current or the maximum out power when the small area search is performed.

Figure 8:
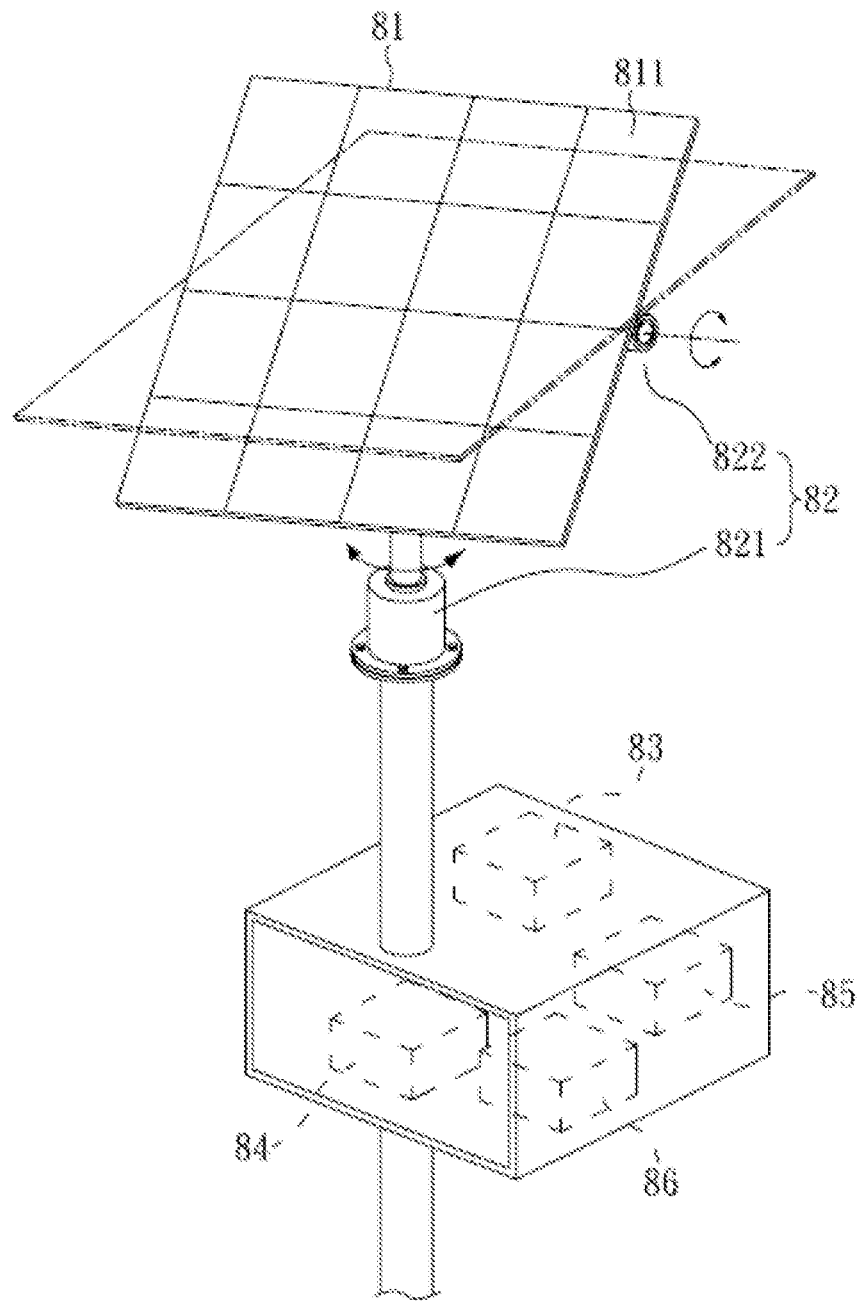
FIG. 8 is a 3D view of the sun tracking system of an embodiment of the present disclosure.

Please refer to FIG. 8. FIG. 8 is a 3D view of the sun tracking system of an embodiment of the present disclosure. As shown in FIG. 8, the sun tracking system comprises a photovoltaic cell device 81, an attitude control device 82, a short-circuit current sensing device 83, a maximum power tracking control device 84, a motor-driving device 85 and a control unit 86. The photovoltaic cell device 81 comprises a plurality of photovoltaic cells 811. The attitude control device 82 is adapted to the photovoltaic cell device 81 to control the attitude of the photovoltaic cell device 81. The short-circuit current sensing device 83 is coupled to the photovoltaic cell device 81 to sense a short-circuit current of the photovoltaic cell device 81. The maximum power tracking control device 84 is coupled to the photovoltaic cell device 81 to track a maximum power of the photovoltaic cell device 81. The motor-driving device 85 is adapted to the attitude control device 82 to drive a motor of the attitude control device 82 to change the attitude of the photovoltaic cell device 81. The control unit 86 is coupled to the short-circuit current sensing device 83, the maximum power tracking control device 84 and the motor-driving device 85.

When the photovoltaic cell device 81 is in operation, the control unit 86 drives the motor-driving device 85 to further drive the motor of the attitude control device 82 to change the attitude of the photovoltaic cell device 81. The short-circuit current sensing device 83 senses and records a short-circuit current of the photovoltaic cell device 81 continuously in cooperation with the switching behavior of the power unit 845 of the maximum power tracking control device 84 when the attitude of the photovoltaic cell device 81 is changing. Afterwards, the control unit 86 further calculates a maximum value of the recorded short-circuit current to drive the motor-driving device 85 to modulate the attitude of the photovoltaic cell device 81 such that the attitude of the photovoltaic cell device 81 corresponds to the maximum value of the short-circuit current.

In another embodiment, the short-circuit current sensing device 83 senses the short-circuit current without in cooperation with the switching behavior of the power unit of the maximum power tracking control device. The switch behavior of the switch unit of the short-circuit current sensing device 83 is only performed when the sun-tracking method is used. The frequency of the switch behavior is very high (e.g. over 1000 times per second). The short-circuit current sensing device 83 senses and records the short-circuit current of the photovoltaic cell device 81 at the moment when the switch power unit 831 forms the closed circuit. Afterwards, the control unit 86 further calculates a maximum value of the recorded short-circuit current to drive the motor-driving device 85 to modulate the attitude of the photovoltaic cell device 81 such that the attitude of the photovoltaic cell device 81 corresponds to the maximum value of the short-circuit current.

In yet another embodiment, the short-circuit current sensing device 83 is not presented. The sun-tracking system comprises a photovoltaic cell device 81, an attitude control device 82, a maximum power tracking control device 84, a motor-driving device 85 and a control unit 86. The maximum power tracking control device 84 is a voltage up adjusting circuit or a voltage up/down adjusting circuit and is not limited by the circuit form shown in FIG. 8. The maximum power tracking control device 84 comprises a sensing device that senses current, voltage or power. Afterwards, the control unit 86 further calculates a maximum value of the recorded output power to drive the motor-driving device 85 to modulate the attitude of the photovoltaic cell device 81 such that the attitude of the photovoltaic cell device 81 corresponds to the maximum value of the output power.

In some embodiments, the sun tracking system further comprises a memory (such as a DRAM, not shown) coupled to the control unit 86 to store the values of the short-circuit current each corresponding to a specific attitude of the photovoltaic cell device 81. Therefore, besides the sun tracking process, the sun tracking system of the present disclosure can retrieve the stored values that are stored within a specific time interval (such as one day or one week) for subsequent analysis.

In the present embodiment, each of the plurality of the photovoltaic cells 811 of the photovoltaic cell device 81 is a general photovoltaic cell, a concentrated photovoltaic cell or a highly concentrated photovoltaic cell. The attitude control device 82 comprises an azimuth angle control unit 821 and an elevation angle control unit 822. Each of the azimuth angle control unit 821 and the elevation angle control unit 822 comprises a control motor (e.g. a DC motor, an AC synchronous motor or a stepping motor) and a speed reducer to control the attitude (comprising the azimuth angle and the elevation angle) of the photovoltaic cell device 81. The attitude control device 82 further comprises an azimuth angle limit switch 823 and an elevation angle limit switch 824 to control the displacement distance of the azimuth angle control unit 821 and the elevation angle control unit 822.

Figure 9:
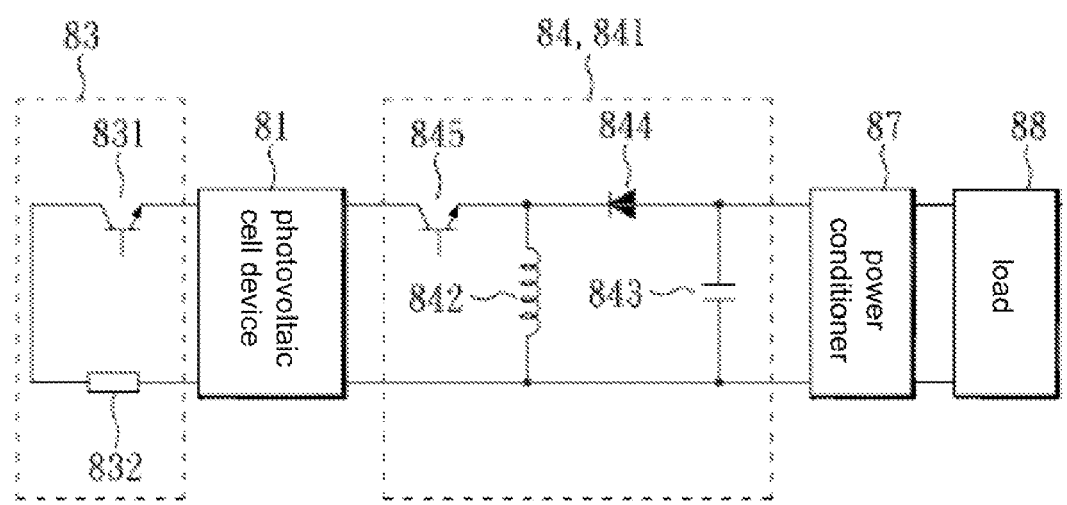
FIG. 9 is a diagram depicting the relation of the photovoltaic cell device, the short-circuit current sensing device and the maximum power tracking control device.

As shown in FIG. 9, the short-circuit current sensing device 83 at least comprises a first switch power unit 831 and a current-sensing circuit unit 832. The maximum power tracking control device 84 comprises a voltage up/down adjusting circuit unit 841 comprising at least an inductor 842, a capacitor 843, a diode 844 and a second switch power unit 845.

The photovoltaic cell device 81, the short-circuit current sensing device 83 and the maximum power tracking control device 84 are set as depicted in FIG. 9. In other words, the short-circuit current sensing device 83 and the photovoltaic cell device 81 are coupled together while the maximum power tracking control device 84 and the photovoltaic cell device 81 are coupled together on the other end. However, in other embodiments, the short-circuit current sensing device 83 and the maximum power tracking control device 84 are integrated as a sensing circuit module (not shown) to connect to the photovoltaic cell device 81. Besides, the maximum power tracking control device 84 is coupled to a power conditioner (e.g. inverter) 87 and a load 88 to generate an output current to the load 88.

When the sun tracking method of the present disclosure is in operation, the first switch power unit 831 in the short-circuit current sensing device 83 and the second switch power unit 845 in the maximum power tracking control device 84 conduct alternatively to alternatively sense and record the short-circuit current of the photovoltaic cell device 81 and to track a maximum power of the photovoltaic cell device 81. In other words, the sun tracking method is operated in cooperation with the voltage up/down adjusting procedure for tracking the maximum power of the photovoltaic cell device 81 adapted in the maximum power tracking control device 84. The sensing of the short-circuit current of the photovoltaic cell device 81 (when the first switch power unit 831 is closed and conducting) is performed when the second switch power unit 845 is open-circuited and non-conducting). In the present embodiment, each of the first switch power unit 831 and the second switch power unit 845 is a MOSFET, a power transistor or an insulated gate bipolar transistor (IGBT).

In another embodiment, the first switch power unit 831 of the short-circuit current sensing device 83 shown in FIG. 9 is not coupled to the second switch power unit 845 of the photovoltaic cell device 81. The switch behavior of the first switch power unit 831 of the short-circuit current sensing device 83 is only performed when the sun-tracking method is used. The frequency of the switch behavior is very high (e.g. over 1000 times per second). The short-circuit current sensing device 83 senses and records the short-circuit current of the photovoltaic cell device 81 at the moment when the first switch power unit 831 forms the closed circuit. Afterwards, the control unit 86 further calculates a maximum value of the recorded short-circuit current to drive the motor-driving device 85 to modulate the attitude of the photovoltaic cell device 81 such that the attitude of the photovoltaic cell device 81 corresponds to the maximum value of the short-circuit current.

In yet another embodiment, the short-circuit current sensing device 83 is not presented. The maximum power tracking control device 84 is a voltage up adjusting circuit or a voltage up/down adjusting circuit and is not limited by the circuit form shown in FIG. 9. The maximum power tracking control device 84 comprises a sensing device that senses current, voltage or power. Afterwards, the control unit 86 further calculates a maximum value of the recorded output power to drive the motor-driving device 85 to modulate the attitude of the photovoltaic cell device 81 such that the attitude of the photovoltaic cell device 81 corresponds to the maximum value of the output power.

On the other hand, when the sun tracking method of the present disclosure is in operation, the current-sensing circuit unit 832 of the short-circuit current sensing device 83 sense the short-circuit current of the photovoltaic cell device 81 by a resistive measurement method, a Hall effect measurement method or a CT method. The resistive measurement method is a common way to measure the current. By connecting a resistor with small resistance to the under-measured current and measuring the potential difference between the two ends of the resistor, the function V=IR can be used to calculate the value of the current since the current is in direct proportion to the voltage when the resistive of the resistor is fixed. The advantage of the resistive measurement method is that it is simple and is suitable for both AC and DC. The disadvantage includes low output voltage, large insertion loss and difficulty of the insulation from the current.

The CT method is to make the under-test wire pass through a magnetic path. A magnetic filed B is generated due to the presence of the current $I_O$ in the magnetic path to further induce an induced current at the coil on the magnetic path. The resistive measurement method described above can further be used to measure the value of the induced current. The difference between the CT method and the resistive measurement method is that there is no resistor directly coupled to the current $I_O$ during the measurement of the induced current. The advantage of the CT method includes wider range of application, larger output voltage and the great quality of insulation from the current. The Hall effect measurement method is similar to the CT method that makes use of the magnetic field of the magnetic path generated by the presence of the under-measured current. The difference between the Hall effect measurement method and the CT method is that a space is presented in the magnetic path when the Hall effect measurement method is adapted to dispose a Hall element in said space. The generated magnetic field makes the Hall element generate a Hall voltage that can be measured to further derive the value of the under-measured current.

In the sun tracking method of the present disclosure, the attitude of the photovoltaic cell device 81, including an azimuth angle and an elevation angle, is changed according to a search rule. In an embodiment, the search rule is an AI-based algorithm. The AI-based algorithm can be a conventional algorithm such as, but not limited to, a fuzzy algorithm, an ant algorithm, a Taguchi algorithm or a genetic algorithm. Since these algorithms are conventional, no further detail is discussed here.

Further, it takes a long time to perform calibration during the initial setting of the light sensors in the conventional device. The short-circuit current or the output power sensing method in the present disclosure can be used to track the attitude of the photovoltaic cell device that generates the maximum output power and record the difference values of the azimuth angle and the elevation angle as a reference to calibrate the light sensors during the initial setting or after the light sensors are used. The method disclosed in the present disclosure can also be performed in cooperation with the conventional tracking method that uses light sensors. The conventional tracking method that uses light sensors can be performed to accomplish a rough tracking first and the sun-tracking method of the present disclosure can be used to accomplish a precise tracking later.

When clouds block the photovoltaic cell device, the values of the P-V characteristic curve of the photovoltaic cell device decrease a lot. In other words, when clouds block the photovoltaic cell device, the output current or the output power decreases a lot. Accordingly, whether the sensed short-circuit current or the output power is lower than a certain fixed value is determined first. When the short-circuit current or the output power is lower than the fixed value, the process of the sun-tracking method of the present disclosure is ceased. Once the short-circuit current or the output power is sensed to be higher than the fixed value, the process of the sun-tracking method of the present disclosure is started again. The method disclosed in the present disclosure can also be performed in cooperation with the conventional tracking method that uses solar orbit function. The conventional tracking method that uses sun-tracking solar orbit function can use a simple solar orbit function to accomplish a rough tracking first. It is noted that a complex solar orbit function need be implemented in a computer or a PLC but a simple solar orbit function can be implemented in a microprocessor. Afterwards, the sun-tracking method of the present disclosure can be used to accomplish a precise tracking. Furthermore, when clouds block the photovoltaic cell device, the current and the output power is lower than a fixed value. When the short-circuit current or the output power is lower than the fixed value, the process of the sun-tracking method of the present disclosure is ceased and the conventional tracking method that uses solar orbit function can be applied to track the sun. Once the short-circuit current and the output power is sensed to be higher than the fixed value, the process of the sun-tracking method of the present disclosure is started again.

In conclusion, the short-circuit current of the photovoltaic cell device or the output power varies when the illumination of the light received by the photovoltaic cell device changes (i.e. the value of the short-circuit current of the photovoltaic cell device or the value of the output power corresponds to the illumination of the light received by the photovoltaic cell device). Hence, the sun tracking method of the present disclosure keeps monitoring the variation of the short-circuit current of the photovoltaic cell device or the output power adapted in the sun tracking system of the present disclosure to make the control unit drive the motor-driving device to further drive the motor of the attitude control device to change the attitude of the photovoltaic cell device until the attitude of the photovoltaic cell device corresponding to the largest short-circuit current is reached.

In general, the attitude corresponding to the largest short-circuit current or the maximum output power is the attitude that can receive the highest illumination of the sunlight. Hence, the sun tracking method of the present disclosure makes the sun tracking system of the present disclosure track the sun continuously and switches its position to the attitude that can receive the highest illumination of the sunlight without additional light sensors, calculation of the solar orbit function, regular calibration of the mechanical structure of the sun tracking system regularly or precise initial installation of the sun tracking system.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A sun tracking method adapted in a sun tracking system comprising a photovoltaic cell device, an attitude control device, a short-circuit current sensing device, a maximum power tracking control device, a motor-driving device and a control unit, wherein the maximum power tracking control device at least comprises a switch power unit, the sun tracking method comprises:
   (A) driving the motor-driving device to further drive a motor of the attitude control device to change the attitude of the photovoltaic cell device, sensing and recording a short-circuit current of the photovoltaic cell device by a short-circuit current sensing device continuously, in cooperation with the switching behavior of the power unit of the maximum power tracking control device;
   (B) calculating a maximum value of the recorded short-circuit current with the control unit; and
   (C) driving the motor-driving device to modulate the attitude of the photovoltaic cell device such that the attitude of the photovoltaic cell device corresponds to the maximum value of the short-circuit current.

2. The sun tracking method of claim 1, wherein the short-circuit current sensing device at least comprises a first switch power unit and a current-sensing circuit unit.

3. The sun tracking method of claim 2, wherein the maximum power tracking control device comprises a voltage up/down adjusting circuit unit comprising at least an inductor, a capacitor, a diode and a second switch power unit.

4. The sun tracking method of claim 3, wherein the first switch power unit and the second switch power unit conduct alternatively to alternatively sense and record the short-circuit current of the photovoltaic cell device and to track a maximum power of the photovoltaic cell device.

5. The sun tracking method of claim 1, wherein the attitude of the photovoltaic cell device is changed according to a search rule in step (A), where the attitude of the photovoltaic cell device comprises an azimuth angle and an elevation angle.

6. The sun tracking method of claim 5, wherein the search rule is an is AI-based algorithm.

7. The sun tracking method of claim 6, wherein the AI-based algorithm is a fuzzy algorithm, an ant algorithm, a Taguchi algorithm or a genetic algorithm.

8. The sun tracking method of claim 5, wherein the search rule comprises the steps of:
(A1) adjusting the elevation angle of the photovoltaic cell device to a specific elevation angle;
(A2) adjusting the azimuth angle of the photovoltaic cell device such that the azimuth angle of the photovoltaic cell device increases from a first specific azimuth angle to a second specific azimuth angle;
(A3) adjusting the azimuth angle of the photovoltaic cell device to a specific azimuth angle corresponding to the maximum value of the recorded short-circuit current;
(A4) adjusting the elevation angle of the photovoltaic cell device such that the elevation angle of the photovoltaic cell device increases from a negative angle to a positive angle; and
(A5) adjusting the elevation angle of the photovoltaic cell device to a specific elevation angle corresponding to the maximum value of the recorded short-circuit current.

9. The sun tracking method of claim 8, wherein an adjustable range of the elevation angle of the photovoltaic cell device is determined by a location of at least one limit switch of the attitude control device.

10. The sun tracking method of claim 8, wherein an adjustable range of the azimuth angle of the photovoltaic cell device is determined by a location of at least one limit switch of the attitude control device.

11. The sun tracking method of claim 1, wherein the short-circuit current of the photovoltaic cell device is sensed by a resistive measurement method.

12. The sun tracking method of claim 1, wherein the short-circuit current of the photovoltaic cell device is sensed by a Hall effect measurement method.

13. The sun tracking method of claim 1, wherein the short-circuit current of the photovoltaic cell device is sensed by a CT method.

14. The sun tracking method of claim 8, further comprising a step (A6) of adjusting the azimuth angle of the photovoltaic cell device such that the photovoltaic cell device moves in a clockwise direction to detect whether the short-circuit current of the photovoltaic cell device decreases.

15. The sun tracking method of claim 14, further comprising a step (A7) of adjusting the azimuth angle of the photovoltaic cell device such that the photovoltaic cell device moves in a counterclockwise direction to detect whether the short-circuit current of the photovoltaic cell device decreases.

16. The sun tracking method of claim 15, further comprising a step (A8) of adjusting the azimuth angle of the photovoltaic cell device to another specific azimuth angle corresponding to the maximum value of the recorded short-circuit current.

17. The sun tracking method of claim 16, further comprising a step (A9) of adjusting the elevation angle of the photovoltaic cell device such that the photovoltaic cell device moves in a negative angle direction to detect whether the short-circuit current of the photovoltaic cell device decreases.

18. The sun tracking method of claim 17, further comprising a step (A10) of adjusting the elevation angle of the photovoltaic cell device such that the photovoltaic cell device moves in a positive angle direction to detect whether the short-circuit current of the photovoltaic cell device decreases.

19. The sun tracking method of claim 18, further comprising a step (A11) of adjusting the elevation angle of the photovoltaic cell device to another specific elevation angle corresponding to the maximum value of the recorded short-circuit current.

20. The sun tracking method of claim 1, further comprising a step (D) of changing the attitude of the photovoltaic cell device according to a search rule after the maximum value of the recorded short-circuit current decreases to a certain level and/or after a predetermined time interval passes and sensing and recording the short-circuit current of the photovoltaic cell device by the short-circuit current sensing device continuously to modulate the attitude of the photovoltaic cell device such that attitude of the photovoltaic cell device corresponds to the newly-calculated maximum value of the short-circuit current.

21. The sun tracking method of claim 20, wherein the search rule is a perturbation and observation method.

22. The sun tracking method of claim 20, wherein the search rule is an AI-based algorithm.

23. The sun tracking method of claim 20, wherein the predetermined time interval is in a range from 1 to 10 minutes.

24. The sun tracking method of claim 1, wherein before step (A), step (B) and step (C) further comprises a step of performing a sun-tracking process by using light sensors to accomplish a rough tracking first, wherein a precise tracking is accomplished by performing step (A), step (B) and step (C) after the rough tracking.

25. The sun tracking method of claim 1, wherein before step (A), step (B) and step (C) further comprises a step of performing a sun-tracking process by using of a sun-tracking solar orbit function to accomplish a rough tracking first, wherein a precise tracking is accomplished by performing step (A), step (B) and step (C) after the rough tracking.

26. The sun tracking method of claim 1, wherein after step (A) further comprises determining whether the short-circuit current is lower than a fixed value, in which when the short-circuit current is lower than the fixed value, further comprises the steps of:
stopping to drive the motor-driving device;
sensing the short-circuit current of the photovoltaic cell device; and
starting to drive the motor-driving device to perform step (B) and step (C) when the short-circuit current of the photovoltaic cell device is larger than the fixed value.

27. The sun tracking method of claim 1, wherein after step (A) further comprises determining whether the short-circuit current is lower than a fixed value, in which when the short-circuit current is lower than the fixed value, further comprises the steps of:
driving the motor-driving device according to a sun-tracking solar orbit function;
sensing the short-circuit current of the photovoltaic cell device; and
performing step (B) and step (C) when the short-circuit current of the photovoltaic cell device is larger than the fixed value.

28. A sun tracking method adapted in a sun tracking system comprising a photovoltaic cell device, an attitude control device, a short-circuit current sensing device, a motor-driving device and a control unit, wherein the short-circuit current sensing device at least comprises a switch power unit and a current-sensing circuit unit, the sun tracking method comprises:
(A) driving the motor-driving device to further drive a motor of the attitude control device to change the attitude of the photovoltaic cell device, sensing and recording a short-circuit current of the photovoltaic cell device by using the short-circuit current sensing device at a moment when the switch power unit forms a closed circuit;
(B) calculating a maximum value of the recorded short-circuit current with the control unit; and (C) driving the motor-driving device to modulate the attitude of the photovoltaic cell device such that the attitude of the photovoltaic cell device corresponds to the maximum value of the short-circuit current.

29. The sun tracking method of claim 28, wherein before step (A), step (B) and step (C) further comprises a step of performing a sun-tracking process by using light sensors to accomplish a rough tracking first, wherein a precise tracking is accomplished by performing step (A), step (B) and step (C) after the rough tracking.

30. The sun tracking method of claim 28, wherein before step (A), step (B) and step (C) further comprises a step of performing a sun-tracking process by using of a sun-tracking solar orbit function to accomplish a rough tracking first, wherein a precise tracking is accomplished by performing step (A), step (B) and step (C) after the rough tracking.

31. The sun tracking method of claim 28, wherein after step (A) further comprises determining whether the short-circuit current is lower than a fixed value, in which when the short-circuit current is lower than the fixed value, further comprises the steps of:
  stopping to drive the motor-driving device;
  sensing the short-circuit current of the photovoltaic cell device; and
  starting to drive the motor-driving device to perform step (B) and step (C) when the short-circuit current of the photovoltaic cell device is larger than the fixed value.

32. The sun tracking method of claim 28, wherein after step (A) further comprises determining whether the short-circuit current is lower than a fixed value, in which when the short-circuit current is lower than the fixed value, further comprises the steps of:
  driving the motor-driving device according to a sun-tracking solar orbit function;
  sensing the short-circuit current of the photovoltaic cell device; and
  performing step (B) and step (C) when the short-circuit current of the photovoltaic cell device is larger than the fixed value.

33. A sun tracking method adapted in a sun tracking system comprising a photovoltaic cell device, an attitude control device, a maximum power tracking control device, a motor-driving device and a control unit, wherein the maximum power tracking control device at least comprises a switch power unit and a current, voltage or power sensing device, the sun tracking method comprises:

(A) driving the motor-driving device to further drive a motor of the attitude control device to change the attitude of the photovoltaic cell device, sensing and recording an output power of the photovoltaic cell device by the current, voltage or power sensing device of the maximum power tracking control device;
(B) calculating a maximum value of the recorded output power with the control unit; and
(C) driving the motor-driving device to modulate the attitude of the photovoltaic cell device such that the attitude of the photovoltaic cell device corresponds to the maximum value of the output power.

34. The sun tracking method of claim 33, wherein before step (A), step (B) and step (C) further comprises a step of performing a sun-tracking process by using light sensors to accomplish a rough tracking first, wherein a precise tracking is accomplished by performing step (A), step (B) and step (C) after the rough tracking.

35. The sun tracking method of claim 33, wherein before step (A), step (B) and step (C) further comprises a step of performing a sun-tracking process by using of a sun-tracking solar orbit function to accomplish a rough tracking first, wherein a precise tracking is accomplished by performing step (A), step (B) and step (C) after the rough tracking.

36. The sun tracking method of claim 33, wherein after step (A) further comprises determining whether the output power is lower than a fixed value, in which when the output power is lower than the fixed value, further comprises the steps of:
  stopping to drive the motor-driving device;
  sensing the output power of the photovoltaic cell device; and
  starting to drive the motor-driving device to perform step (B) and step (C) when the output power of the photovoltaic cell device is larger than the fixed value.

37. The sun tracking method of claim 33, wherein after step (A) further comprises determining whether the output power is lower than a fixed value, in which when the output power is lower than the fixed value, further comprises the steps of:
  driving the motor-driving device according to a sun-tracking solar orbit function;
  sensing the output power of the photovoltaic cell device; and
  performing step (B) and step (C) when the output power of the photovoltaic cell device is larger than the fixed value.

\* \* \* \* \*